US008717306B2

(12) United States Patent
Choi et al.

(10) Patent No.: US 8,717,306 B2
(45) Date of Patent: May 6, 2014

(54) TOUCH PANEL COMPRISING TOUCH POSITION SENSOR ELEMENTS

(75) Inventors: Jin-Young Choi, Seoul (KR); Jin Jeon, Anyang-si (KR); Kee-Han Uh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1352 days.

(21) Appl. No.: 12/057,638

(22) Filed: Mar. 28, 2008

(65) Prior Publication Data
US 2009/0058825 A1   Mar. 5, 2009

(30) Foreign Application Priority Data

Aug. 31, 2007  (KR) .................. 10-2007-0088098

(51) Int. Cl.
G06F 3/041  (2006.01)
(52) U.S. Cl.
USPC ........................................... 345/173
(58) Field of Classification Search
USPC ......................... 345/156, 173–178
See application file for complete search history.

(56) References Cited

U.S. PATENT DOCUMENTS

| 4,893,115 | A | * | 1/1990 | Blanchard | 345/174 |
| 5,181,030 | A | * | 1/1993 | Itaya et al. | 341/20 |
| 5,867,151 | A | * | 2/1999 | Nakai | 345/173 |
| 6,501,529 | B1 | * | 12/2002 | Kurihara et al. | 349/160 |
| 7,463,756 | B2 | * | 12/2008 | Benkley, III | 382/126 |

FOREIGN PATENT DOCUMENTS

| JP | 2001075074 A | 3/2001 |
| KR | 1020070088008 A | 8/2007 |

* cited by examiner

Primary Examiner — Chanh Nguyen
Assistant Examiner — Ram Mistry
(74) Attorney, Agent, or Firm — Cantor Colburn LLP

(57) ABSTRACT

In a touch panel and a display apparatus having the touch panel, the touch panel includes a plurality of sensor lines, a plurality of sensor switches, a line selecting unit and a sensor resistor section. The sensor switches are electrically connected to the sensor lines, respectively, and apply sensing signals to the sensor lines, respectively, when a touch event occurs. The line selecting unit is electrically connected to end portions of the sensor lines and sequentially outputs the sensing signals transferred through the sensor lines. The sensor resistor section includes a first end electrically connected to the sensor lines, respectively, and a second end opposite to the first end. The second end receives a driving direct current (DC) voltage. Therefore, the touch panel may have an improved ability to detect touch events.

22 Claims, 8 Drawing Sheets

TOUCH PANEL COMPRISING TOUCH POSITION SENSOR ELEMENTS

This application claims priority to Korean Patent Application No. 2007-88098, filed on Aug. 31, 2007, and all of the benefits accruing therefrom under 35 U.S.C. §119, the contents of which in its entirety are herein incorporated by reference.

BACKGROUND OF THE INVENTION

1. Field of the Invention

The present invention relates to a touch panel and a display apparatus having the same. More particularly, the present invention relates to a touch panel having a liquid crystal layer and a display apparatus having the touch panel.

2. Description of the Related Art

A touch panel is an electric device that executes an internal program in response to a touch event such as a compression, light, etc. The touch panel receives the touch event from the exterior and detects a touch position of the touch event, and then executes the internal program corresponding to the touch position.

The touch panel is adapted to a flat display device such as a liquid crystal display device ("LCD"). The LCD having the touch panel detects the touch position of the touch event applied on a display screen thereof, and executes the internal program corresponding to the touch position to display an image.

The touch panel includes sensor lines, sensor switches, a line selecting circuit and an operational amplifier. Input terminals of the sensor switches are electrically connected to a common electrode to which a common voltage is applied. Output terminals of the sensor switches are electrically connected to an input terminal of the line selecting circuit via the sensor lines. An output terminal of the line selecting circuit is electrically connected to the input terminal of the line selecting circuit so that the output terminal of the line selecting circuit sequentially outputs sensing signals transferred via the sensor lines. The operational amplifier receives the sensing signals from the line selecting circuit and compares the sensing signals with a reference voltage so that the operational amplifier generates a sensing output signal having information regarding whether the touch event has occurred.

An input terminal of the operational amplifier is electrically connected to a pull-up resistor so that the operational amplifier compares the sensing signals with the reference voltage. That is, a first end of the pull-up resistor receives a driving direct current ("DC") voltage, and a second end of the pull-up resistor opposite to the first end of the pull-up resistor is electrically connected to the input terminal of the operational amplifier.

The input terminal of the operational amplifier is electrically connected to the sensor switch via the line selecting circuit so that the input terminal of the operational amplifier receives the voltage of an output terminal of the sensor switch during turn-on time of the line selecting circuit. Therefore, the operational amplifier compares the voltage of an output terminal of the sensor switch with the reference voltage.

Since the input terminal of the operational amplifier is electrically connected to the line selecting circuit and receives the driving DC voltage through the pull-up resistor, voltage levels of the sensing signals applied to the input terminal of the operational amplifier may be changed whenever the line selecting circuit sequentially receives the sensing signals from the sensor lines.

The input terminal of the operational amplifier receives the driving DC voltage through the pull-up resistor when the touch event does not occur. On the other hand, when the touch event occurs, the input terminal of the operational amplifier receives the common voltage through the sensor line and the line selecting circuit from the output terminal of the sensor switch.

The sensor line is formed on the touch panel to have a high parasitic capacitance so that the sensor line stores some quantity of charge. The sensor line receives the driving DC voltage through the pull-up resistor and the line selecting circuit during the turn-on time of the line selecting circuit. A large amount of time may be required to charge the output terminal of the sensor switch with the driving DC voltage due to the high parasitic capacitance of the sensor line. Thus, the sensor line electrically connected to the output terminal of the sensor switch may not be charged with the driving DC voltage. Also, the pull-up resistor and the turn-on resistor of the line selecting circuit may prevent the output terminal of the sensor switch from being charged with the driving DC voltage.

When the output terminal of the sensor switch and the sensor line are charged with a voltage different from the driving DC voltage, the touch panel may execute the internal program of the touch event even though a touch event does not occur during the turn-on time of the line selecting circuit.

BRIEF SUMMARY OF THE INVENTION

The present invention has made an effort to solve the above-stated problems and aspects of the present invention provide a touch panel having an improved ability to detect touch events, and a display apparatus including the touch panel.

In an exemplary embodiment, the present invention provides a touch panel which includes a plurality of sensor lines, a plurality of sensor switches electrically connected to the sensor lines, respectively, which apply sensing signals to the sensor lines, respectively when a touch even occurs, a line selecting unit electrically connected to end portions of the sensor lines, which sequentially outputs the sensing signals transferred through the sensor lines, and a sensor resistor section which includes a first end electrically connected to the sensor lines, respectively, and a second end opposite to the first end, where a driving direct current (DC) voltage is applied to the second end of the sensor resistor section.

According to an exemplary embodiment, the sensor lines include first sensor lines arranged in a first direction and second sensor lines arranged in a second direction which crosses the first direction.

Each of the sensor switches is electrically connected to the first sensor line and the second sensor line so that each of the sensor switches applies the sensing signals to the first sensor line and the second sensor line when the touch event occurs. According to an exemplary embodiment, the line selecting unit includes a first selecting unit and a second selecting unit. The first selecting unit is electrically connected to end portions of the first sensor lines so that the first selecting unit sequentially outputs the sensing signals transferred through the first sensor lines. The second selecting unit is electrically connected to end portions of the second sensor lines so that the second selecting unit sequentially outputs the sensing signals transferred through the second sensor lines. According to an exemplary embodiment, the sensor resistor section includes first sensor resistors and second sensor resistors. First ends of the first sensor resistors are electrically connected to the first sensor lines, respectively, and second ends of the first sensor resistors is opposite to the first ends of the first sensor resistors, the driving DC voltage being applied to the second ends of the first sensor resistors. First ends of the second sensor resistors are electrically connected to the second sensor lines, respectively, and second ends of the second sensor resistors are opposite to the first ends of the second sensor resistors, the driving DC voltage being applied to the second ends of the second sensor resistors.

According to an exemplary embodiment, the touch panel further includes a scan signal generating section which sequentially applies scan signals to the first sensor lines along the first direction. Each of the sensor switches is electrically connected to the first sensor line and the second sensor line so that each of the sensor switches applies the sensing signals to the second sensor line by using the scan signal transferred via the first sensor line when the touch event occurs.

The line selecting unit is electrically connected to end portions of the second sensor lines so that the line selecting unit sequentially outputs the sensing signals transferred via the second sensor lines. According to an exemplary embodiment, the sensor resistor section includes a plurality of sensor resistors which are disposed around input terminals of the second selecting unit, wherein first ends of the sensor resistors are electrically connected to the second sensor lines, respectively, and second ends of the sensor resistors are opposite to the first ends of the sensor resistors. The second ends of the sensor resistors receive the driving DC voltage.

According to an exemplary embodiment, the touch panel further includes a first substrate having a plurality of pixel parts to display images, a second substrate facing the first substrate, and a liquid crystal layer interposed between the first and second substrates. The sensor lines are formed on the first substrate.

According to an exemplary embodiment, each of the sensor switches includes a first sensor electrode formed on the first substrate to be electrically connected to the first sensor line, a second sensor electrode formed on the first substrate adjacent to the first sensor electrode to be electrically connected to the second sensor line, and a touch electrode formed to face the first and second sensor electrodes so that the touch electrode makes contact with the first and second sensor electrodes due to an external force.

According to an exemplary embodiment, the second substrate includes a common electrode to which a common voltage is applied, and the touch electrode is spaced apart from the common electrode by a predetermined distance. Alternatively, according to another exemplary embodiment, the second substrate includes a common electrode to which a common voltage is applied, and the touch electrode is one portion of the common electrode.

According to an exemplary embodiment, each of the sensor switches further includes a touch spacer which is formed between the touch electrode and the second substrate to decrease a distance between the touch electrode and the first and second sensor electrodes.

The line selecting unit and the sensor resistor section are formed on the first substrate. Each of the pixel parts includes a pixel electrode to which the pixel voltage is applied, and the sensor resistor section is formed of a conductive layer to form the pixel electrode.

According to an exemplary embodiment, the touch panel further includes a signal output unit which sequentially receives the sensing signals from the line selecting unit, and outputs sensing output signals in response to the sensing signals.

According to an exemplary embodiment, the line selecting unit includes selecting transistors electrically connected to end portions of the sensor lines, respectively, and selecting control parts which control the selecting transistors, respectively, so that the selecting transistors sequentially turn on. Input terminals of the selecting transistors are electrically connected to the sensor lines, respectively, output terminals of the selecting transistors are electrically connected to the signal output unit via one line, and control terminals of the selecting transistors are electrically connected to the selecting control parts, respectively.

According to an exemplary embodiment, the signal output unit comprises an operational amplifier which compares voltages received from the selecting transistors with a reference voltage so as to output the sensing output signals.

According to another exemplary embodiment, the present invention provides a display apparatus which includes a touch panel that displays images and senses touch events and a panel driving section which applies image signals to the touch panel so that the touch panel displays the images.

According to an exemplary embodiment, the touch panel includes a plurality of sensor lines, a plurality of sensor switches electrically connected to the sensor lines, respectively, so that the sensor switches apply sensing signals to the sensor lines, respectively, when a touch event occurs, and a line selecting unit electrically connected to end portions of the sensor lines so that the line selecting unit sequentially outputs the sensing signals transferred through the sensor lines, and a sensor resistor section which includes a first end electrically connected to the sensor lines, respectively, and a second end opposite to the first end a driving DC voltage being applied to the first end of the sensor resistor section.

According to an exemplary embodiment, a sensor resistor section is not be disposed on an output terminal of a line selecting unit and is instead disposed on an input terminal of the line selecting unit so that the sensor resistor section is electrically connected to sensor lines. Therefore, the voltage of a sensing signal applied to a signal output unit is prevented from changing due to selecting transistors of the line selecting unit and the sensor lines. Thus, a touch panel of the present invention may have an improved ability to detect touch events.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
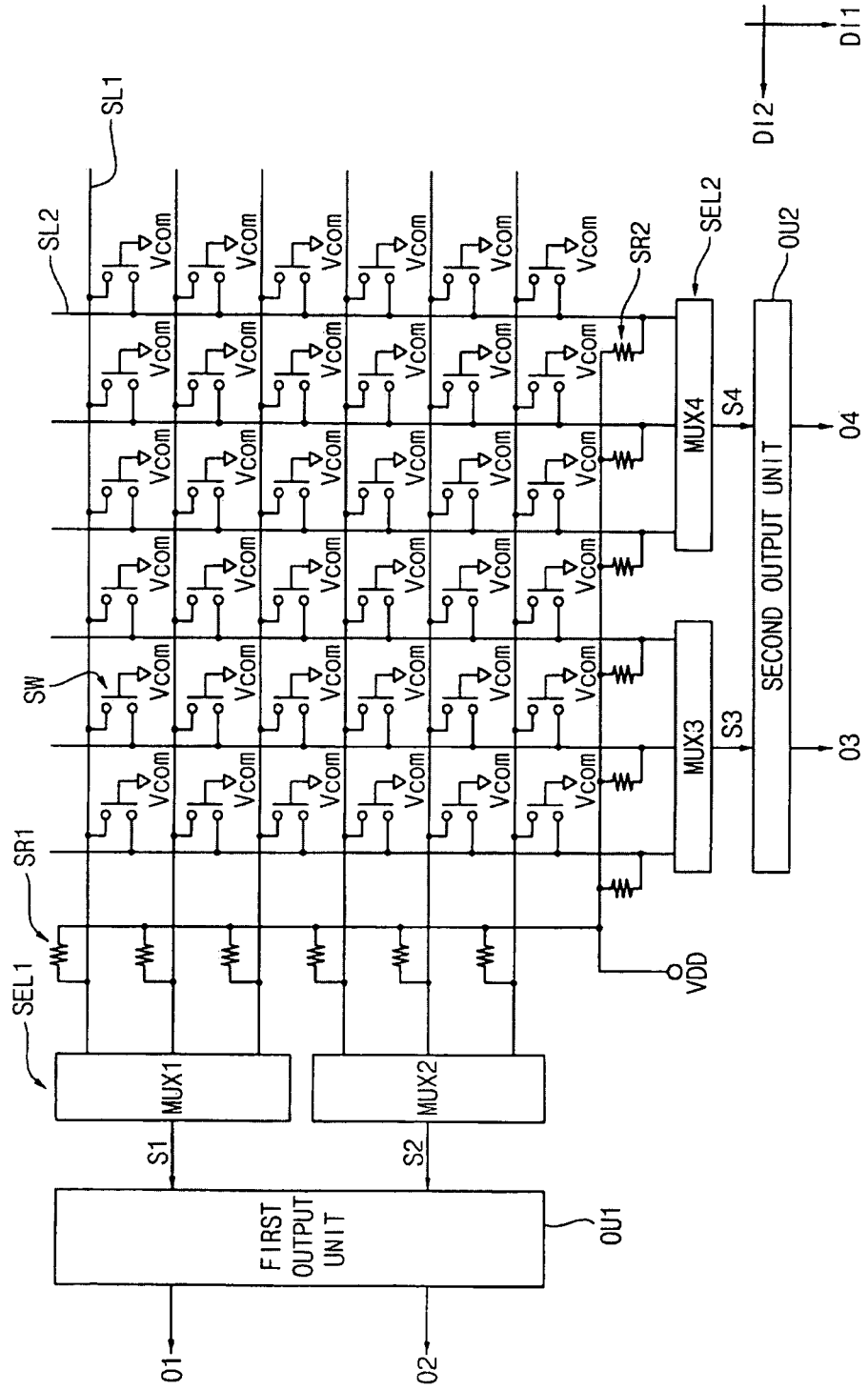
FIG. 1 is a circuit diagram schematically illustrating an exemplary embodiment of a touch panel according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a circuit diagram schematically illustrating an exemplary embodiment of a touch panel according to the present invention.

Referring to FIG. 1, a touch panel according to the present invention includes a plurality of sensor lines, a plurality of sensor switches SW, a line selecting unit, a sensor resistor section and a signal output unit.

The sensor lines include a plurality of first sensor lines SL1 and a plurality of second sensor lines SL2. The first sensor lines SL1 are disposed substantially parallel with each other along a first direction DI1. The second sensor lines SL2 are disposed substantially parallel with each other along a second direction DI2 crossing the first direction DI1. That is, the first sensor lines SL1 are extended along the second direction DI2, and the second sensor lines SL2 are extended along the first direction DI1. According to an exemplary embodiment, the first and second directions DI1 and DI2 are substantially perpendicular to each other. According to an exemplary embodiment, six of the first sensor lines SL1 may be disposed substantially parallel with each other along the first direction DI1, and six of the second sensor lines SL2 may be disposed substantially parallel with each other along the second direction DI2.

The sensor switches SW are disposed in positions where the first and second sensor lines SL1 and SL2 cross each other. Each of the sensor switches SW electrically connects one of the first sensor lines SL1 and one of the second sensor lines SL2. When a touch event occurs from the exterior, each of the sensor switches SW applies a sensing signal to the first sensor line SL1 and the second sensor line SL2. For example, thirty-six of the sensor switches SW may be disposed in a 6-by-6 matrix shape to correspond to six of the first sensor lines SL1 and six of the second sensor lines SL2.

According to an exemplary embodiment, the touch event is a compression force, light, or magnetic force, for example, applied onto a touch panel. The touch event may be applied to the touch panel, thereby turning on at least one of the sensor switches SW. The at least one of the sensor switches SW is turned on to apply a common voltage Vcom to the first sensor line SL1 and the second sensor line SL2.

According to an exemplary embodiment, the line selecting unit includes a first selecting unit SEL1 corresponding to the first sensor lines SL1 and a second selecting unit SEL2 corresponding to the second sensor lines SL2.

The first selecting unit SEL1 is electrically connected to end portions of the first sensor lines SL1 so that the first selecting unit SEL1 sequentially outputs the sensing signals transferred through the first sensor lines SL1. The second selecting unit SEL2 is electrically connected to end portions of the second sensor lines SL2 so that the second selecting unit SEL2 sequentially outputs the sensing signals transferred through the second sensor lines SL2.

According to an exemplary embodiment, the first selecting unit SEL1 includes a first selection circuit MUX1 and a second selection circuit MUX2, and the second selecting unit SEL2 includes a third selection circuit MUX3 and a fourth selection circuit MUX4.

According to an exemplary embodiment, the first selection circuit MUX1 is electrically connected to end portions of three of the first sensor lines SL1 so that the first selection circuit MUX1 sequentially outputs first sensing signals S1 transferred through three of the first sensor lines SL1. The second selection circuit MUX2 is electrically connected to end portions of remainders of the first sensor lines SL1 so that the second selection circuit MUX2 sequentially outputs second sensing signals S2 transferred through the remainders of the first sensor lines SL1.

As shown in FIG. 1, the third selection circuit MUX3 is electrically connected to end portions of three of the second sensor lines SL2 so that the third selection circuit MUX3 sequentially outputs third sensing signals S3 transferred through the three of the second sensor lines SL2. The fourth selection circuit MUX4 is electrically connected to end portions of remainders of the second sensor lines SL2 so that the fourth selection circuit MUX4 sequentially outputs fourth sensing signals S4 transferred through the remainders of the second sensor lines SL2.

According to an exemplary embodiment, the sensor resistor section includes first sensor resistors SR1 corresponding to the first sensor lines SL1 and second sensor resistors SR2 corresponding to the second sensor lines SL2.

The first sensor resistors SR1 are disposed around input terminals of the first selecting unit SEL1. The first sensor resistors SR1 may be disposed between the first selecting unit SEL1 and the sensor switches SW. First ends of the first sensor resistors SR1 are electrically connected to the first sensor lines SL1, respectively, and second ends of the first sensor resistors SR1 are opposite to the first ends of the first sensor resistors SR1. A driving direct current (DC) voltage VDD is applied to the second ends of the first sensor resistors SR1.

The second sensor resistors SR2 are disposed around input terminals of the second selecting unit SEL2. The second sensor resistors SR2 is disposed between the second selecting unit SEL2 and the sensor switches SW. First ends of the second sensor resistors SR2 are electrically connected to the second sensor lines SL2, respectively, and second ends of the second sensor resistors SR2 are opposite to the first ends of the second sensor resistors SR2. The driving DC voltage VDD is applied to the second ends of the second sensor resistors SR2.

According to an exemplary embodiment, the signal output unit includes a first output unit OU1 corresponding to the first selecting unit SEL1 and a second output unit OU2 corresponding to the second selecting unit SEL2.

Further, as shown in FIG. 1, the first output unit OU1 outputs first output signals O1 in response to the first sensing signals S1 received from the first selection circuit MUX1, and outputs second output signals O2 in response to the second sensing signals S2 received from the second selection circuit MUX2. The second output unit OU2 outputs third output signals O3 in response to the third sensing signals S3 received from the third selection circuit MUX3, and outputs fourth output signals O4 in response to the fourth sensing signals S4 received from the fourth selection circuit MUX4. The first, second, third and fourth sensing output signals O1, O2, O3 and O4 have position information related to the touch event.

Figure 2:
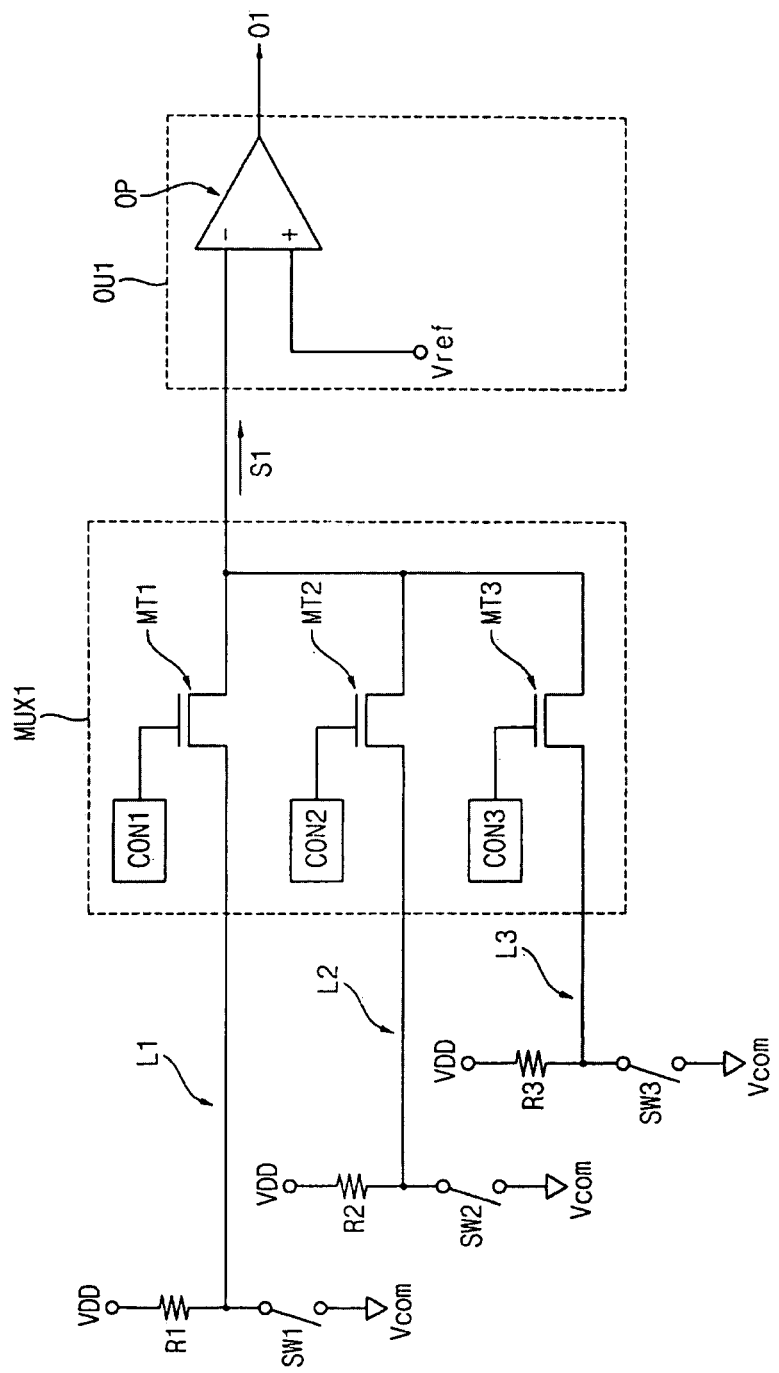
FIG. 2 is an enlarged circuit diagram illustrating an exemplary embodiment of a portion of the touch panel of FIG. 1, describing electrical connections among elements of the touch panel of FIG. 1, according to the present invention.

FIG. 2 is an enlarged circuit diagram illustrating an exemplary embodiment of a portion of the touch panel of FIG. 1, describing electrical connections among elements of the touch panel of FIG. 1, according to an exemplary embodiment.

Referring to FIGS. 1 and 2, according to an exemplary embodiment, the first selection circuit MUX1 includes first, second and third selecting transistors MT1, MT2, MT3 and first, second and third selecting control parts CON1, CON2, CON3. The first, second and third selecting transistors MT1, MT2 and MT3 are electrically connected to end portions of the first sensor lines SL1, respectively, and the first, second and third selecting control parts CON1, CON2 and CON3 control the first, second and third selecting transistors MT1, MT2 and MT3, respectively, so that the first, second and third selecting transistors MT1, MT2 and MT3 are sequentially turned on.

The first sensor lines SL1 include a first line L1, a second line L2 and a third line L3. The first sensor resistors SR1 include a first resistor R1, a second resistor R2 and a third resistor R3. The sensor switches SW include a first switch SW1, a second switch SW2 and a third switch SW3. The first output unit OU1 includes an operational amplifier OP.

A first end of the first switch SW1 receives the common voltage Vcom, and a second end of the first switch SW1 is electrically connected to the first line L1. The second end of the first switch SW1 is opposite to the first end of the first switch SW1. A first end of the first resistor R1 receives the driving DC voltage VDD, and a second end of the first resistor R1 is electrically connected to the second end of the first switch SW1 and the first line L1. The second end of the first resistor R1 is opposite to the first end of the first resistor R1.

A first end of the second switch SW2 receives the common voltage Vcom, and a second end of the second switch SW2 is electrically connected to the second line L2. The second end of the second switch SW2 is opposite to the first end of the second switch SW2. A first end of the second resistor R2 receives the driving DC voltage VDD, and a second end of the second resistor R2 is electrically connected to the second end of the second switch SW2 and the second line L2. The second end of the second resistor R2 is opposite to the first end of the second resistor R2.

A first end of the third switch SW3 receives the common voltage Vcom, and a second end of the third switch SW3 is electrically connected to the third line L3. The second end of the third switch SW3 is opposite to the first end of the third switch SW3. A first end of the third resistor R3 receives the driving DC voltage VDD, and a second end of the third resistor R3 is electrically connected to the second end of the third switch SW3 and the third line L3. The second end of the third resistor R3 is opposite to the first end of the third resistor R3.

An input terminal of the first selecting transistor MT1 is electrically connected to the first line L1, an output terminal of the first selecting transistor MT1 is electrically connected to a first input terminal of the operational amplifier OP, and a control terminal of the first selecting transistor MT1 is electrically connected to the first selecting control part CON1.

An input terminal of the second selecting transistor MT2 is electrically connected to the second line L2, and an output terminal of the second selecting transistor MT2 is electrically connected to the first input terminal of the operational amplifier OP. A control terminal of the second selecting transistor MT2 is electrically connected to the second selecting control part CON2.

An input terminal of the third selecting transistor MT3 is electrically connected to the third line L3, and an output terminal of the third selecting transistor MT3 is electrically connected to the first input terminal of the operational amplifier OP. A control terminal of the third selecting transistor MT3 is electrically connected to the third selecting control part CON3.

Output terminals of the first, second and third selecting transistors MT1, MT2 and MT3 are electrically connected to the first input terminal of the operational amplifier OP via one line. A second input terminal of the operational amplifier OP receives a reference voltage Vref. According to an exemplary embodiment, the first input terminal of the operational amplifier OP is a negative input terminal, and the second input terminal of the operational amplifier OP is a positive input terminal.

The operational amplifier OP compares a voltage received through the first input terminal with the reference voltage Vref so that an output terminal of the operational amplifier OP outputs the first output signals O1. According to an exemplary embodiment, the first output signals O1 are digital signals. That is, the first output signals O1 include a value of "1", for example, when the voltage received through the first input terminal of the operational amplifier OP is larger than the reference voltage Vref, and the first output signals O1 include a value of "0" when the voltage received through the first input terminal of the operational amplifier OP is smaller than the reference voltage Vref.

Hereinafter, the circuit of FIG. 2 will be briefly described as follows.

When at least one of the first, second and third switches SW1, SW2 and SW3 is turned on, the common voltage Vcom is applied to at least one of the first, second and third lines L1, L2 and L3. That is, the first, second and third switches SW1, SW2 and SW3 apply the first sensing signals S1 to the first, second and third lines L1, L2 and L3 due to the touch event.

The first, second and third selecting control parts CON1, CON2 and CON3 sequentially turn on the first, second and third selecting transistors MT1, MT2 and MT3. Thus, the first, second and third selecting transistors MT1, MT2 and MT3 sequentially output the first sensing signals S1 to the first input terminal of the operational amplifier OP.

The operational amplifier OP compares the voltage applied to the first input terminal with the reference voltage Vref so that the operational amplifier OP outputs the first output signals O1 having the information regarding whether the first, second and third switches SW1, SW2 and SW3 are turned on.

Therefore, the first, second and third resistors R1, R2 and R3 are disposed around the input terminals of the first selection circuit MUX1, and are electrically connected to the first, second and third lines L1, L2 and L3, so that the voltage of the sensing signals applied to the first input terminal of the operational amplifier OP may be prevented from changing due to the first, second and third selecting transistors MT1, MT2 and MT3.

On the other hand, when a pull-up resistor is electrically connected to the first input terminal of the operational amplifier OP, the operational amplifier OP outputs the first output signals O1 having the information regarding whether the touch event has occurred even though the touch event has not occurred.

Thus, when the first, second and third selecting transistors MT1, MT2 and MT3 are sequentially turned on, the driving DC voltage VDD applied to the end portion of the pull-up resistor is transferred to the sensor lines and the output terminal of the sensor switches through the first, second and third selecting transistors MT1, MT2 and MT3.

Since the sensor lines have a high parasitic capacitance, a large amount of time is required to charge the sensor lines and the output terminals of the sensor switches SW1, SW2 and SW3 with a driving DC voltage. Also, the pull-up resistor and the turn-on resistor of the line selecting unit may prevent the sensor lines and the output terminals of the sensor switches SW1, SW2 and SW3 from being charged with the driving DC voltage.

As a result, since the output terminals of the sensor switches SW1, SW2 and SW3 and the sensor lines may be charged with a voltage different from the driving DC voltage, the voltage different from the driving DC voltage may be applied to the first input terminal of the operational amplifier OP when the first, second and third selecting transistors MT1, MT2 and MT3 are turned on. Thus, the touch panel may execute the internal program of the touch event. That is, the operational amplifier OP outputs the first output signals O1 having the information regarding whether the touch event has occurred even though the touch event has not occurred.

However, since the pull-up resistor is not electrically connected to the first input terminal of the operational amplifier OP but is connected to the input terminal of the line selecting unit, the touch panel may be prevented from erroneously executing the internal program of the touch event even though the touch event does not occur.

According to an exemplary embodiment, the first, second and third resistors R1, R2 and R3 may be disposed around the input terminal of the first selection circuit MUX1 so that the first, second and third resistors R1, R2 and R3 are electrically connected to the input terminals of the first, second and third selecting transistors MT1, MT2 and MT3, respectively. Also, the first, second and third resistors R1, R2 and R3 are electrically connected to the output terminals of the first, second and third switches SW1, SW2 and SW3, respectively. Thus, the driving DC voltage is applied directly to the output terminals of the first, second and third switches SW1, SW2 and SW3 through the first, second and third resistors R1, R2 and R3.

Since the driving DC voltage is applied directly to the output terminals of the first, second and third switches SW1, SW2 and SW3 through the first, second and third resistors R1, R2 and R3, the output terminals of the first, second and third switches SW1, SW2 and SW3 are more easily charged with the driving DC voltage. Thus, the touch panel may be prevented from erroneously executing the internal program of the touch event even though the touch event does not occur.

In the present invention, the first selection circuit MUX1 may not include the first, second and third selecting control parts CON1, CON2, CON3. That is, the first, second and third selecting transistors MT1, MT2, MT3 may receive first, second and third selecting control signals from a external controlling circuit (not shown), and may be controlled by the first, second and third selecting control signals.

The above-mentioned description of the first selection circuit MUX1 of FIG. 2 may also be applied to the second, third and fourth selection circuit MUX2, MUX3 and MUX4, therefore, a description thereof has been omitted.

Figure 3:
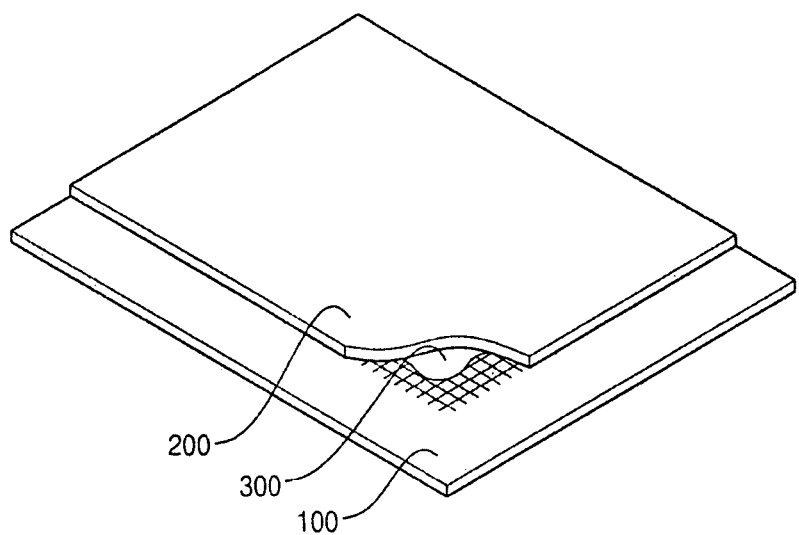
FIG. 3 is a perspective view schematically illustrating an exemplary embodiment of a panel unit of the touch panel of FIG. 1, according to the present invention.
Figure 4:
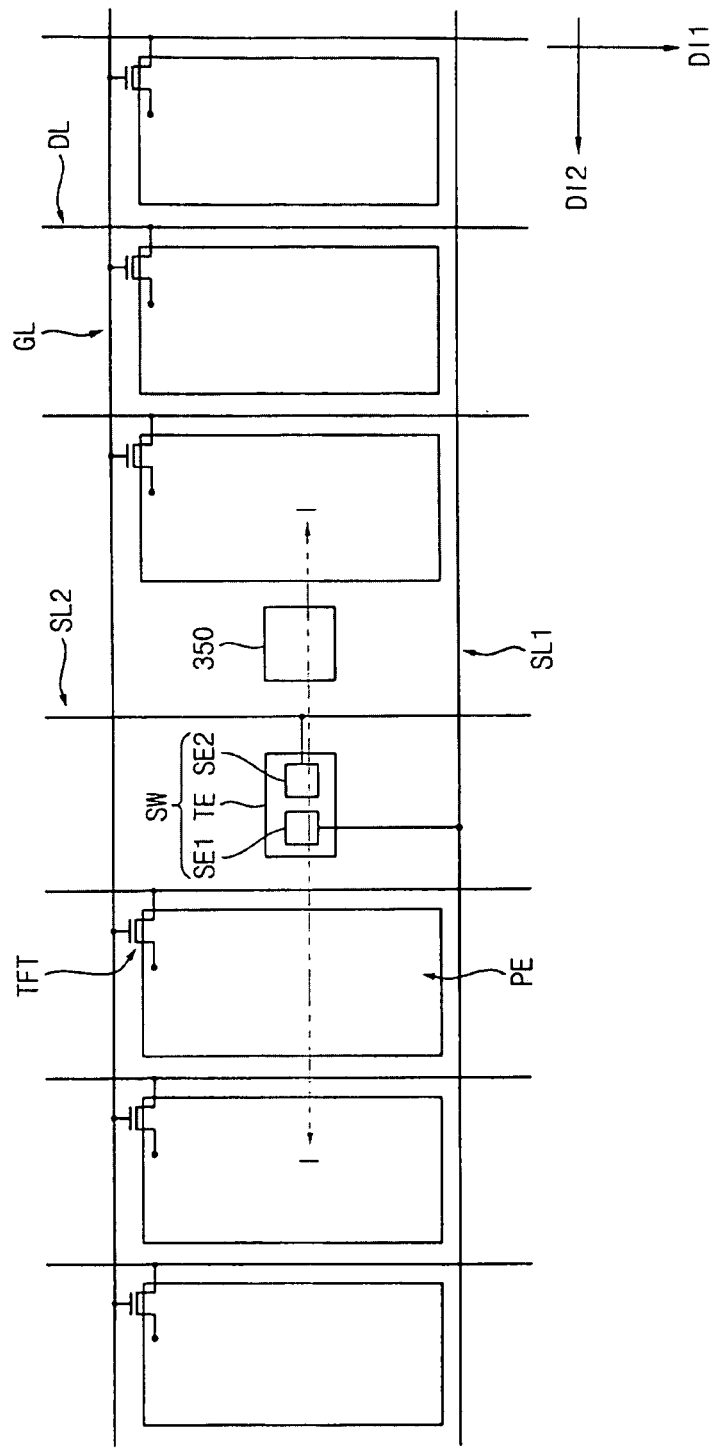
FIG. 4 is an enlarged plan view schematically illustrating an exemplary embodiment of a portion of the touch panel of FIG. 3, according to the present invention.
Figure 5:
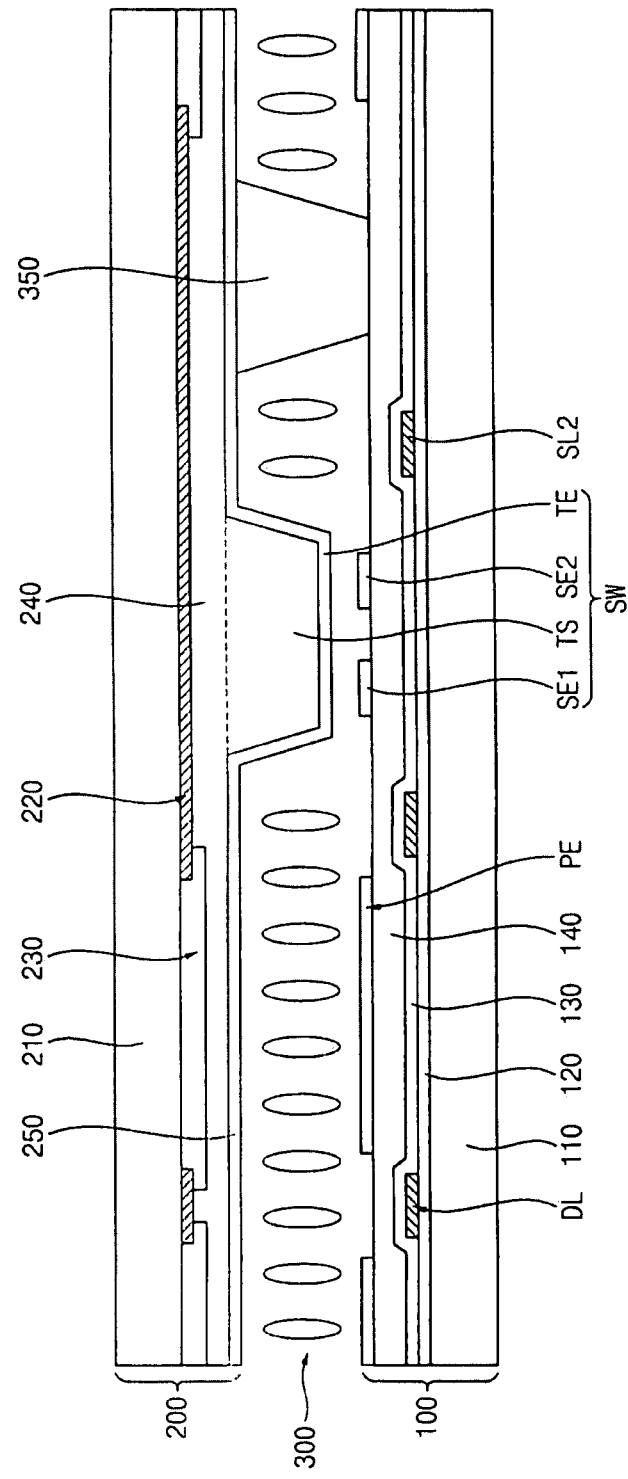
FIG. 5 is a cross-sectional view taken along a line I-I' of FIG. 4.

FIG. 3 is a perspective view schematically illustrating an exemplary embodiment of a panel unit of the touch panel of FIG. 1, according to the present invention. FIG. 4 is an enlarged plan view schematically illustrating an exemplary embodiment of a portion of the touch panel of FIG. 3, according to the present invention. FIG. 5 is a cross-sectional view taken along a line I-I' of FIG. 4.

Referring to FIGS. 3, 4 and 5, the touch panel according to the present exemplary embodiment further includes a panel unit having the sensor lines and the sensor switches.

The panel unit includes a first substrate 100, a second substrate 200 facing the first substrate 100, a liquid crystal layer 300 interposed between the first and second substrates 100 and 200, and a cell gap maintaining member 350 that maintains a cell gap between the first and second substrates 100 and 200.

The first substrate 100 includes the first sensor lines SL1 and the second sensor lines SL2. The first substrate 100 further includes a first base substrate 110, a plurality of gate lines GL, a gate insulation layer 120, a plurality of data lines DL, a plurality of thin-film transistors ("TFTs"), a passivation layer 130, an organic insulation layer 140, and a plurality of pixel electrodes PE.

According to an exemplary embodiment, the first base substrate 110 includes a plate-shape. The first base substrate 110 includes an optically transparent material such as glass, quartz, plastic, etc.

As shown in FIG. 4, the gate lines GL are formed on the first base substrate 110, and are disposed substantially in parallel along the first direction DI1. The gate lines GL may be extended along the second direction DI2.

The first sensor lines SL1 are formed on the first base substrate 110, and are disposed substantially in parallel along the first direction DI1. The first sensor lines SL1 are extended along the second direction DI2, and are disposed adjacent to the gate lines GL.

The gate insulation layer 120 is formed on the first substrate 110 to cover the gate lines GL and the first sensor lines SL1.

According to an exemplary embodiment, the data lines DL are formed on the gate insulation layer 120, and are disposed substantially in parallel along the second direction DI2. The data lines DL are extended along the first direction DI1.

The second sensor lines SL2 are formed on the gate insulation layer 120, and are disposed substantially in parallel along the second direction DI2. The second sensor lines SL2 are extended along the first direction DI1, and are disposed adjacent to the data lines DL.

The TFTs are formed in crossing areas where the gate lines GL and the data lines DL cross each other. Each of the TFTs is electrically connected to one of the gate lines GL and one of the data lines DL.

The passivation layer 130 is formed on the gate insulation layer 120 and covers the data lines DL, the second sensor lines SL2, and the TFTs. According to an exemplary embodiment, the passivation layer 130 includes silicon nitride (SiNx), silicon oxide (SiOx), for example.

As shown in FIG. 5, the organic insulation layer 140 is formed on the passivation layer 130. A surface of the organic insulation layer includes a substantially plane shape. Alternatively, according to another exemplary embodiment, the organic insulation layer 140 may be omitted from the first substrate 100.

The pixel electrodes PE are formed on the organic insulation layer 140. The pixel electrodes PE are formed in crossing areas where the gate lines GL and the data lines DL cross each other. Each of the pixel electrodes PE is electrically connected to one of the TFTs. According to an exemplary embodiment, the pixel electrodes PE includes an optically transparent and electrically conductive material. Alternatively, according to another exemplary embodiment, a plurality of reflective electrodes (not shown) may be formed on the pixel electrodes PE.

Further, as shown in FIG. 5, the second substrate 200 includes a second base substrate 210, a light-blocking pattern 220, a plurality of color filters 230, an organic covering layer 240, and a common electrode 250.

According to an exemplary embodiment, the second base substrate 210 is opposite to the first base substrate 110. The second base substrate 210 includes a plate shape. The second base substrate 210 includes an optically transparent material such as glass, quartz, plastic, etc.

The light-blocking pattern 220 is formed on a first surface of the second base substrate 210 facing the first base substrate 110. The light-blocking pattern 220 covers the gate lines GL, the data lines DL, the first sensor lines SL1, the second sensor lines SL2 and the TFTs. Furthermore, the light-blocking pattern 220 covers the sensor switches SW and the cell gap maintaining members 350.

According to an exemplary embodiment, the color filters 230 are formed on the first surface of the second base substrate 210 to face the pixel electrodes PE, respectively. The color filters 230 include, for example, a plurality of red color filters, a plurality of green color filters, and a plurality of blue color filters. Alternatively, according to another exemplary embodiment, the color filters 230 are formed on the first base substrate 110.

According to an exemplary embodiment, the organic covering layer 240 is formed on the second base substrate 210 to cover the color filters 230 and the light-blocking pattern 220. Alternatively, according to another exemplary embodiment, the organic covering layer 240 may be omitted from the first substrate 100.

According to an exemplary embodiment, the common electrode 250 is formed on the organic covering layer 240. The common electrode 250 includes an optically transparent and electrically conductive material. The common electrode 250 receives the common voltage from an external device (not shown).

The liquid crystal layer 300 is interposed between the first and second substrates 100 and 200. According to an exemplary embodiment, an arrangement of liquid crystal molecules of the liquid crystal layer 300 is altered by an electric field generated between the pixel electrodes PE and the common electrode 250.

The cell gap maintaining members 350 are interposed between the first and second substrates 100 and 200. The cell gap maintaining members 350 may uniformly maintain a cell gap between the first and second substrates 100 and 200. In an exemplary embodiment, the cell gap maintaining members 350 is a plurality of column spacers formed by patterning an organic layer. In another exemplary embodiment, the cell gap maintaining members 350 is a plurality of ball spacers.

According to an exemplary embodiment, each of the sensor switches SW includes a first sensor electrode SE1, a second sensor electrode SE2, a touch electrode TE, and a touch spacer TS.

According to an exemplary embodiment, the first sensor electrode SE1 is formed on the organic insulation layer 140 of the first substrate 100. The first sensor electrode SE1 is electrically connected to one of the first sensor lines SL1.

The second sensor electrode SE2 is formed on the organic insulation layer 140 of the first substrate 100 to be adjacent to the first sensor electrode SE1. The second sensor electrode SE2 is formed adjacent to the first sensor electrode SE1 along the second direction DI2. The second sensor electrode SE2 is electrically connected to one of the second sensor lines SL2.

The first and second sensor electrodes SE1 and SE2 are spaced apart from the pixel electrodes PE. According to an exemplary embodiment, the first and second sensor electrodes SE1 and SE2 are formed between the pixel electrodes PE. The first and second sensor electrodes SE1 and SE2 and the pixel electrodes PE are formed through the same manufacturing process. That is, the pixel electrode layer formed on the organic insulation layer 140 is patterned, so that the pixel electrodes PE, the first and second sensor electrodes SE1 and SE2 are formed on the same pixel electrode layer.

The touch spacer TS is formed on the organic covering layer 240 corresponding to the first and second sensor electrodes SE1 and SE2. According to an exemplary embodiment, a protrusion height of the touch spacer TS is substantially smaller than that of the cell gap maintaining member 350. According to an exemplary embodiment, the touch spacer TS and the organic covering layer 240 are formed through the same manufacturing process. Alternatively, according to another exemplary embodiment, the touch spacer TS and the organic covering layer 240 are formed through different manufacturing processes. That is, a portion of the organic insulation layer formed on a first surface of the second base substrate 210 is removed to form the organic covering layer 240 and the touch spacer TS. Alternatively, according to another exemplary embodiment, a touch spacer layer formed on the organic covering layer 240 is patterned to form the touch spacer TS.

The touch electrode TE is formed on the touch spacer TS to face the first and second sensor electrodes SE1 and SE2. Since the touch electrode TE is formed on the touch spacer TS, the touch electrode TE are more closely adjacent to the first and second sensor electrodes SE1 and SE2.

Figure 6:
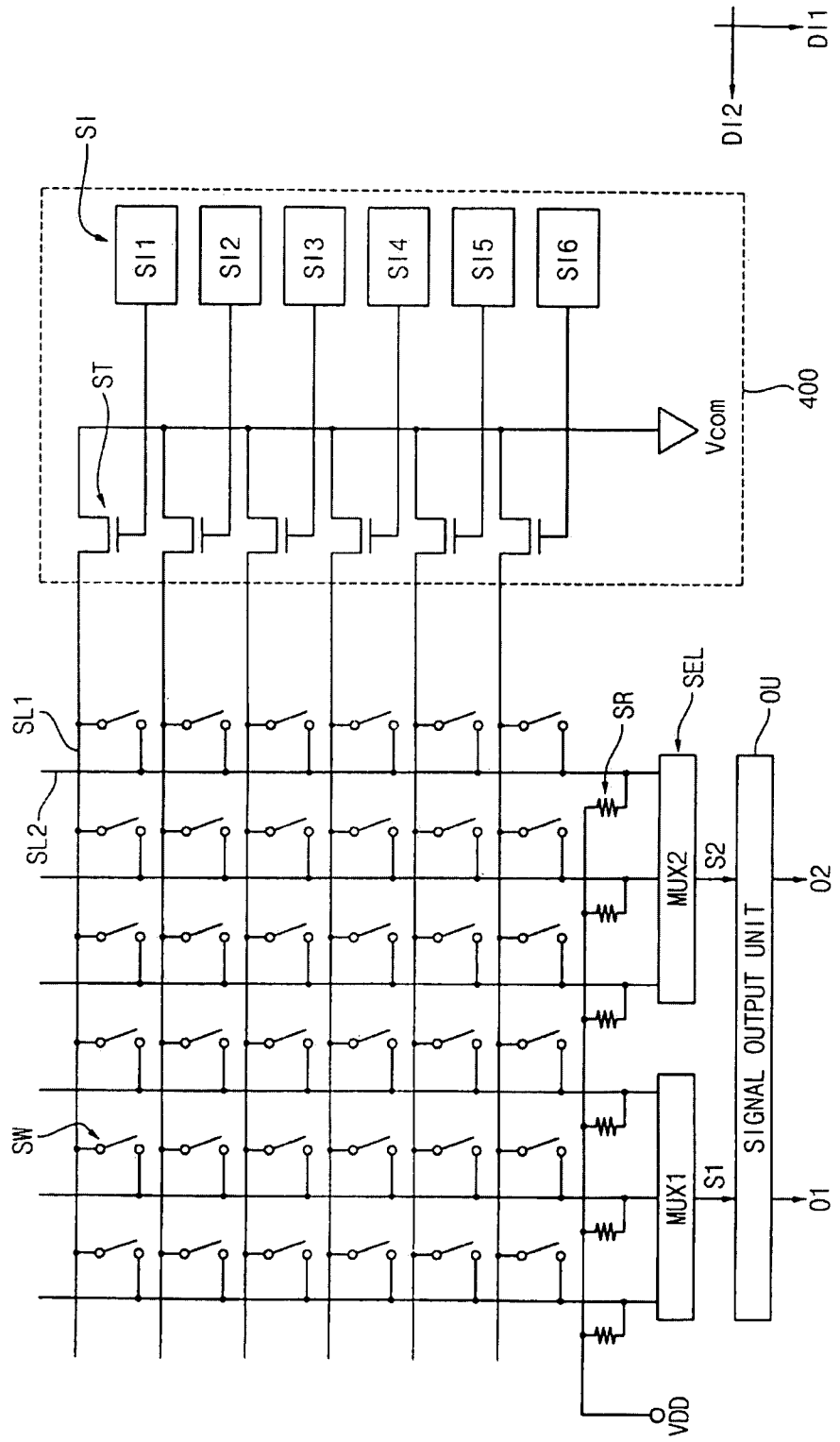
FIG. 6 is a circuit diagram schematically illustrating another exemplary embodiment of a touch panel according to the present invention.

The touch electrode TE contacts with the first and second sensor electrodes SE1 and SE2 due to an external force applied from the outside of the panel unit 400 (shown in FIG. 6). When the external force is not applied to the panel unit 400, the touch electrode TE does not contact the first and second sensor electrodes SE1 and SE2. When the external force is applied to the panel unit 400, the touch electrode TE is contacted with the first and second sensor electrodes SE1 and SE2. Thus, each of the sensor switches SW is turned on or turned off.

According to an exemplary embodiment, the touch electrode TE is electrically connected to the common electrode 250. That is, the touch electrode TE has substantially the same common voltage as the common electrode 250. According to the current exemplary embodiment, the touch electrode TE is one portion of the common electrode 250.

The cell gap maintaining members 350 are formed adjacent to the sensor switches SW, respectively. Accordingly, the cell gap maintaining members 350 prevent the touch electrode TS from contacting the first and second sensor electrodes SE1 and SE2 due to an external impact.

In the present exemplary embodiment, the line selecting unit SEL and the sensor resistor section SR are formed on the first substrate 100. According to an exemplary embodiment, the line selecting unit SEL includes a plurality of selecting transistors formed on the first substrate 100, and the sensor resistor section SR is formed from a conductive layer to form the pixel electrode PE.

FIG. 6 is a circuit diagram schematically illustrating another exemplary embodiment of a touch panel according to the present invention.

Referring to FIG. 6, a touch panel TP according to the exemplary embodiment of the present invention includes a plurality of sensor lines, a scan signal generating section 400, a plurality of sensor switches SW, a line selecting unit SEL, a sensor resistor section SR and a signal output unit OU.

The sensor lines include a plurality of first sensor lines SL1 and a plurality of second sensor lines SL2. The first sensor lines SL1 are disposed substantially parallel with each other along a first direction DI1. The second sensor lines SL2 are disposed substantially parallel with each other along a second direction DI2 crossing the first direction DI1. According to an exemplary embodiment, six of the first sensor lines SL1 are disposed substantially parallel with each other along the first direction DI1, and six of the second sensor lines SL2 are disposed substantially parallel with each other along the second direction DI2.

The scan signal generating section 400 is electrically connected to end portions of the first sensor lines SL1 to apply scan signals to the first sensor lines SL1. The scan signals are sequentially applied to the first sensor lines SL1 along the first direction DI1. For example, six of the scan signals are sequentially applied to six of the first sensor lines SL1 along the first direction DI1.

According to an exemplary embodiment, the scan signal generating section 400 includes a plurality of scan driving transistors ST and a plurality of scan driving control parts S1. The scan driving transistors ST are electrically connected to the end portions of the first sensor lines, respectively. The scan driving control parts S1 are electrically connected to the scan driving transistors ST, respectively, so that the scan driving control parts S1 apply scan control signals to the scan driving transistors ST. The scan control signals may turn on or turn off the scan driving transistors ST, respectively. When the scan driving transistors ST are turned on, the scan driving transistors ST may sequentially apply a common voltage Vcom to the first sensor lines SL1 along the first direction DI1.

As shown in FIG. 6, first to sixth scan control signals SI1, SI2, SI3, SI4, SI5 and SI6 control six of the scan driving transistors ST, respectively.

The sensor switches SW are disposed in positions where the first and second sensor lines SL1 and SL2 cross each other. Each of the sensor switches SW electrically connects one of the first sensor lines SL1 and one of the second sensor lines SL2. Further, as shown in FIG. 6, thirty-six of the sensor switches SW are disposed in a 6-by-6 matrix shape to correspond to six of the first sensor lines SL1 and six of the second sensor lines SL2.

When the sensor switches SW are turned on due to a touch event, the scan signals applied to the first sensor lines SL1 may be transferred to the second sensor lines SL2 through the sensor switches SW. That is, when the touch event occurs, the sensor switches SW may apply the sensing signals to the second sensor lines SL2 by using the scan signals applied to the first sensor lines SL1.

The line selecting unit SEL is electrically connected to end portions of the second sensor lines SL2 so that the line selecting unit SEL sequentially outputs the sensing signals transferred through the second sensor lines SL2. As shown, the line selecting unit SEL includes a first selection circuit MUX1 and a second selection circuit MUX2.

The first selection circuit MUX1 is electrically connected to end portions of three of the second sensor lines SL2 so that the first selection circuit MUX1 sequentially outputs first sensing signals S1 transferred through three of the second sensor lines SL2. The second selection circuit MUX2 is electrically connected to end portions of remainders of the second sensor lines SL2 so that the second selection circuit MUX2 sequentially outputs second sensing signals S2 transferred through the remainders of the second sensor lines SL2.

The sensor resistor section SR includes a plurality of sensor resistors which are disposed around input terminals of the line selecting unit SEL. The sensor resistor section SR may be disposed between the line selecting unit SEL and the sensor switches SW. First ends of the sensor resistors are electrically connected to the second sensor lines SL2, respectively, and second ends of the sensor resistors are opposite to the first ends of the sensor resistors. The second ends of the sensor resistors receive a driving DC voltage VDD.

The signal output unit OU outputs sensing output signals in response to the sensing signals. The signal output unit OU sequentially receives the sensing signals through the line selecting unit SEL. The sensing output signals have position information related to the touch event.

According to an exemplary embodiment, the signal output unit OU outputs first output signals O1 in response to the first sensing signals S1 received from the first selection circuit MUX1, and outputs second output signals O2 in response to the second sensing signals S2 received from the second selection circuit MUX2.

Figure 7:
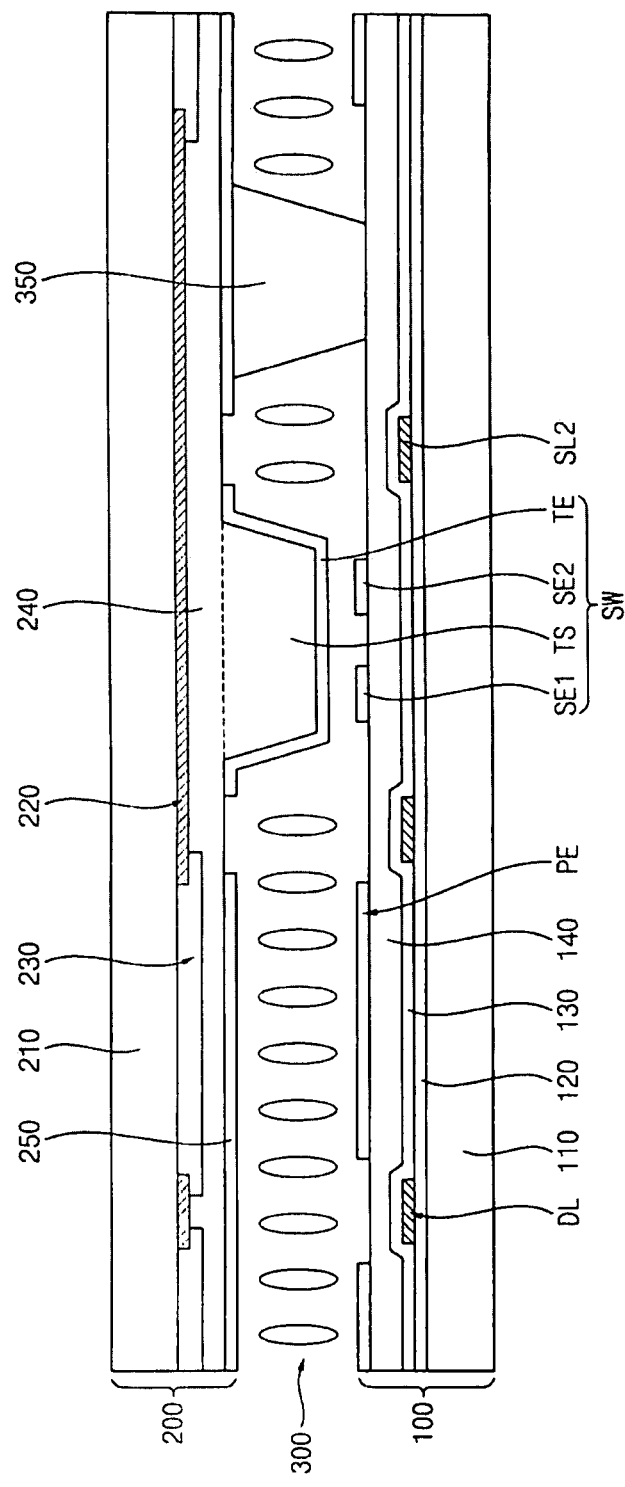
FIG. 7 is a cross-sectional view illustrating an exemplary embodiment of one portion of the touch panel of FIG. 6, according to the present invention.

FIG. 7 is a cross-sectional view illustrating an exemplary embodiment of one portion of the touch panel of FIG. 6, according to the present invention.

Referring to FIGS. 6 and 7, the touch panel according to the exemplary embodiment of the present invention further includes a panel unit having the sensor lines and the sensor switches SW. The touch panel of FIG. 7 is substantially the same as the touch panel of FIGS. 3, 4 and 5 except for the sensor switches SW. The sensor switches SW of the touch panel of FIG. 7 will be described as follows.

Each of the sensor switches SW may include a first sensor electrode SE1, a second sensor electrode SE2, a touch electrode TE, and a touch spacer TS.

The first sensor electrode SE1 is formed on the organic insulation layer 140 of the first substrate 100. The first sensor electrode SE1 is electrically connected to one of the first sensor lines SL1.

The second sensor electrode SE2 is formed on the organic insulation layer 140 of the first substrate 100 to be adjacent to the first sensor electrode SE1. For example, the second sensor electrode SE2 may be formed adjacent to the first sensor electrode SE1 along the second direction DI2. The second sensor electrode SE2 is electrically connected to one of the second sensor lines SL2.

The first and second sensor electrodes SE1 and SE2 are spaced apart from the pixel electrodes PE. The first and second sensor electrodes SE1 and SE2 may be formed between the pixel electrodes PE.

The touch spacer TS is formed on the organic covering layer 240 to correspond with the first and second sensor electrodes SE1 and SE2. A protrusion height of the touch spacer TS may be substantially smaller than that of the cell gap maintaining member 350.

The touch electrode TE is formed on the touch spacer TS to face the first and second sensor electrodes SE1 and SE2. Since the touch electrode TE is formed on the touch spacer TS, the touch electrode TE may be more closely adjacent to the first and second sensor electrodes SE1 and SE2.

The touch electrode TE contacts with the first and second sensor electrodes SE1 and SE2 due to an external force applied from the outside of the panel unit 400. That is the touch electrode TE does not contact the first and second sensor electrodes SE1 and SE2 due to the touch event. Thus, each of the sensor switches SW is turned on or turned off.

The touch electrode TE is spaced apart from the common electrode 250. The touch electrode TE and the common electrode 250 may be formed through the same manufacturing process. That is, the common electrode layer formed on the organic covering layer 240 and the touch spacer TS is patterned, so that the common electrode 250 and the touch electrode TS are formed.

According to the current exemplary embodiment, the touch electrode TS is electrically isolated from the common electrode 250, so that the touch electrode TS performs a role of a switch that electrically connects or isolates between the first and second sensor electrodes SE1 and SE2 due to the external force.

Figure 8:
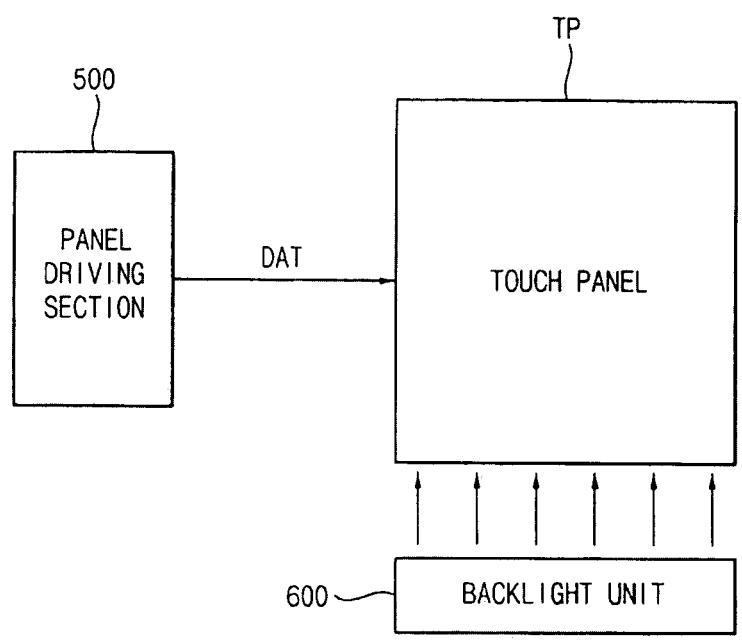
FIG. 8 is a block diagram schematically illustrating an exemplary embodiment of a display apparatus according to the present invention.

FIG. 8 is a block diagram schematically illustrating an exemplary embodiment of a display apparatus according to the present invention.

Referring to FIG. 8, a display apparatus according to the exemplary embodiment of the present invention includes a touch panel TP and a panel driving section 500, and a backlight unit 600.

The touch panel TP displays images and senses touch events. The touch panel TP is substantially the same as the touch panel of FIG. 1 through FIG. 7.

The panel driving section 500 generates image signals DAT to apply the image signals DAT to the touch panel TP, The touch panel TP displays images in response to the image signals DAT. For example, the image signals DAT includes gate signals transferred to gate lines and data signals transferred to data lines.

The backlight unit 600 is disposed under the touch panel TP to supply light to the touch panel TP. The touch panel displays the image by using the light generated from the backlight unit 600. Alternatively, according to another exemplary embodiment, the touch panel TP displays the image by using external light instead of light generated from the backlight unit 600.

According to the above-mentioned present invention, a sensor resistor section SR may not be disposed on an output terminal of a line selecting unit SEL but on an input terminal of the line selecting unit SEL so that the sensor resistor section SR is electrically connected to sensor lines. Therefore, the voltage of a sensing signal applied to a signal output unit OU may be prevented from changing due to selecting transistors of the line selecting unit SEL and the sensor lines. Thus, a touch panel TP of the present invention may have an improved ability to detect touch events.

While the present invention has been shown and described with reference to some exemplary embodiments thereof, it should be understood by those of ordinary skill in the art that various changes in form and details may be made therein without departing from the spirit and scope of the present invention as defined by the appending claims.

What is claimed is:

1. A touch panel comprising:
   a plurality of sensor lines;
   a plurality of sensor switches electrically connected to the sensor lines, respectively, which apply sensing signals to the sensor lines, respectively, when a touch event occurs;
   a line selecting unit electrically connected to end portions of the sensor lines, which sequentially outputs the sensing signals transferred via the sensor lines; and
   a sensor resistor section having a first end electrically connected to the sensor lines, respectively, and a second end opposite to the first end, a driving direct current voltage being applied to the second end thereof,
   wherein the sensor lines includes first sensor lines and second sensor lines, the sensor resistor section includes first sensor resistors electrically and directly connected to the first sensor lines and second sensor resistors electrically and directly connected to the second sensor lines, and each of the first sensor resistors and each of the second sensor resistors are electrically and directly connected to a terminal to which the driving direct current voltage is applied.

2. The touch panel of claim 1, wherein the first sensor lines are arranged in a first direction, and the second sensor lines are arranged in a second direction which crosses the first direction.

3. The touch panel of claim 2, wherein each of the sensor switches is electrically connected to the first sensor line and the second sensor line such that each of the sensor switches applies a sensing signal to the first sensor line and the second sensor line when the touch event occurs.

4. The touch panel of claim 3, wherein the line selecting unit comprises:

a first selecting unit electrically connected to end portions of the first sensor lines, which sequentially outputs the sensing signals transferred through the first sensor lines; and a second selecting unit electrically connected to end portions of the second sensor lines, sequentially outputs the sensing signals transferred through the second sensor lines.

5. The touch panel of claim 4, wherein first ends of the first sensor resistors are electrically connected to the first sensor lines, respectively, and second ends of the first sensor resistors are opposite to the first ends of the first sensor resistors, the second ends of the first sensor resistors receive the driving direct current voltage, and first ends of the second sensor resistors are electrically connected to the second sensor lines, respectively, and second ends of the second sensor resistors are opposite to the first ends of the second sensor resistors, the second ends of the second sensor resistors receive the driving direct current voltage.

6. The touch panel of claim 3, wherein the touch panel further comprises a scan signal generating section which sequentially applies scan signals to the first sensor lines along the first direction.

7. The touch panel of claim 6, wherein each of the sensor switches is electrically connected to the first sensor line and the second sensor line so that each of the sensor switches applies a sensing signal to the second sensor line by using the scan signal transferred through the first sensor line when the touch event occurs.

8. The touch panel of claim 7, wherein the line selecting unit is electrically connected to end portions of the second sensor lines and sequentially outputs the sensing signals transferred through the second sensor lines.

9. The touch panel of claim 8, wherein the sensor resistor section comprises a plurality of sensor resistors which are disposed adjacent to input terminals of the second selecting unit, and first ends of the sensor resistors are electrically connected to the second sensor lines, respectively, and second ends of the sensor resistors are opposite to the first ends of the sensor resistors, the second ends of the sensor resistors receive the driving direct current voltage.

10. The touch panel of claim 2, further comprising:

a first substrate including a plurality of pixel parts to display images;

a second substrate facing the first substrate; and a liquid crystal layer interposed between the first and second substrates.

11. The touch panel of claim 10, wherein the sensor lines are formed on the first substrate.

12. The touch panel of claim 11, wherein each of the sensor switches comprises:

a first sensor electrode formed on the first substrate to be electrically connected to the first sensor line;

a second sensor electrode formed on the first substrate adjacent to the first sensor electrode to be electrically connected to the second sensor line; and a touch electrode formed to face the first and second sensor electrodes such that the touch electrode makes contact with the first and second sensor electrodes due to an external force.

13. The touch panel of claim 12, wherein the second substrate comprises a common electrode to which a common voltage is applied, and the touch electrode is spaced apart from the common electrode by a predetermined distance.

14. The touch panel of claim 12, wherein the second substrate comprises a common electrode to which a common voltage is applied, and the touch electrode is a portion of the common electrode.

15. The touch panel of claim 12, wherein each of the sensor switches further comprises a touch spacer formed between the touch electrode and the second substrate, to decrease a distance between the touch electrode and the first and second sensor electrodes.

16. The touch panel of claim 10, wherein the line selecting unit and the sensor resistor section are formed on the first substrate.

17. The touch panel of claim 16, wherein each of the pixel parts includes a pixel electrode to which the pixel voltage is applied, and the sensor resistor section is formed of a conductive layer to form the pixel electrode.

18. The touch panel of claim 1, wherein the touch panel further comprises: a signal output unit which sequentially receives the sensing signals from the line selecting unit, and outputs sensing output signals in response to the sensing signals.

19. The touch panel of claim 18, wherein the line selecting unit comprises:

selecting transistors electrically connected to end portions of the sensor lines, respectively; and selecting control parts which control the selecting transistors, respectively to sequentially turn on the selecting transistors.

20. The touch panel of claim 19, wherein input terminals of the selecting transistors are electrically connected to the sensor lines, respectively, output terminals of the selecting transistors are electrically connected to the signal output unit via a single line, and control terminals of the selecting transistors are electrically connected to the selecting control parts, respectively.

21. The touch panel of claim 19, wherein the signal output unit comprises an operational amplifier which compares voltages received from the selecting transistors with a reference voltage so as to output the sensing output signals.

22. A display apparatus comprising:

a touch panel which displays images and senses touch events, the touch panel comprising:

a plurality of sensor lines;

a plurality of sensor switches electrically connected to the sensor lines, respectively, which apply sensing signals to the sensor lines, respectively, when a touch event occurs;

a line selecting unit electrically connected to end portions of the sensor lines, which sequentially outputs the sensing signals transferred via the sensor lines; and a sensor resistor section having a first end electrically connected to the sensor lines, respectively, and a second end opposite to the first end, a driving direct current voltage being applied to the second end; and a panel driving section which applies image signals to the touch panel so that the touch panel displays the images, wherein the sensor lines includes first sensor lines and second sensor lines, the sensor resistor section includes first sensor resistors electrically and directly connected to the first sensor lines and second sensor resistors electrically and directly connected to the second sensor lines, and each of the first sensor resistors and each of the second sensor resistors are electrically and directly connected to a terminal to which the driving direct current voltage is applied.

* * * * *